United States Patent [19]

Mortimer

[11] 4,356,884
[45] Nov. 2, 1982

[54] ACOUSTICAL ENCLOSURE SYSTEM

[75] Inventor: David B. Mortimer, Richmond, Va.

[73] Assignee: Reynolds Metals Company, Richmond, Va.

[21] Appl. No.: 297,868

[22] Filed: Aug. 31, 1981

[51] Int. Cl.³ .................... F16F 7/12; G10K 11/00; H02K 5/24

[52] U.S. Cl. .................... 181/200; 181/202; 181/207

[58] Field of Search ............... 181/200–202, 181/205, 207, 208, 290, 294; 83/545, 859, 860

[56] References Cited

U.S. PATENT DOCUMENTS

| | | |
|---|---|---|
| 1,312,651 | 8/1919 | Walters . |
| 1,496,212 | 6/1924 | French . |
| 1,831,797 | 11/1931 | Arnold . |
| 2,583,238 | 1/1952 | Sutton .................... 143/157 |
| 2,769,211 | 11/1956 | Hewitt .................... 181/290 X |
| 2,892,507 | 6/1959 | Kirkpatrick ............... 181/36 |
| 3,773,140 | 11/1973 | Mahajan et al. ............ 181/33 R |
| 3,880,032 | 4/1975 | Green .................... 83/102.1 |
| 3,888,148 | 6/1975 | Weissman ................ 83/100 |
| 4,096,789 | 6/1978 | Blessinger ............... 83/545 X |

FOREIGN PATENT DOCUMENTS 2647251  7/1978  Fed. Rep. of Germany ...... 181/200

OTHER PUBLICATIONS

"A Quieter Saw for Aluminum Extrusions", *Precision Metal*, Dec., 1979, p. 29.

M. Dana Baldwin II, "Sawing Machine Noise Causes and Possible Cures", *Workshop on the Control of Metal Sawing Noise in the Aluminum Industry*, Jun. 9, 1976, pp. II-1-1 to II-1-7.

*Primary Examiner*—Russell E. Adams
*Assistant Examiner*—Thomas H. Tarcza
*Attorney, Agent, or Firm*—Lyne, Girard & McDonald

[57] ABSTRACT

An acoustical enclosure system, particularly designed for overtable circular saws employed in cutting such materials as metal shapes, is disclosed. The system includes an acoustical enclosure covering the saw and a pair of vibration damping arms covering the workpiece being sawed. This combination of elements results in substantially reduced noise levels within the sawing environment.

7 Claims, 5 Drawing Figures

ACOUSTICAL ENCLOSURE SYSTEM

BACKGROUND OF THE INVENTION

Circular saws are used in a variety of industries for cutting objects to length. Such saws are employed in the woodworking industry, in sawmills and the like. Such saws are also widely employed in cutting metal shapes to length, notably metal billets, extrusions and the like.

These cutting operations produce noise levels which may be damaging to worker health. For example, when sawing aluminum extrusions, sound pressure levels of up to one hundred twenty decibels, A-weighted (reference twenty micropascals), may be reached, depending upon the alloy, size and shape of the extrusion being sawed. This sound pressure level approaches the threshold of pain.

Increased concern over worker health and safety recently has evidenced the need for significant reductions in such high noise levels in sawing operations. Every reduction of noise of three decibels is equal to a halving of the noise level.

One solution which has been proposed is to replace existing overtable circular saws with undertable circular saws including internal noise control treatment and vibration damping elements. One such saw is produced by Texas Extrusion Company. Such a solution is not satisfactory, as it requires replacement of existing saws, which requires a heavy capital investment. Further, these saws have not proven themselves capable of withstanding production level operations over an extended period of time.

A more cost effective and realistic approach would make use of existing sawing equipment. Thus, an acoustical enclosure for existing saws, capable of significantly reducing noise levels, is a major objective of the present invention.

THE PRESENT INVENTION

By means of the present invention such an enclosure system is produced. The enclosure system of the present invention includes an acoustical housing for an existing overtable circular saw and a pair of arms extending generally perpendicularly to the direction of travel of the saw blade. These arms include vibration damping material to reduce the tendency for sound to be radiated through the workpiece being cut.

BRIEF DESCRIPTION OF THE DRAWINGS

The acoustical enclosure system of the present invention will be more fully described with reference to the drawings in which.

DETAILED DESCRIPTION OF THE PREFERRED EMBODIMENTS

Turning to the FIGURES, a saw including the acoustical enclosure system of the present invention is illustrated. The saw includes a housing 10, which housing 10 contains the electrical and mechanical elements of the saw, including the motor, therein. A saw blade 12 is connected by linkage means 14 and arms 16 such that the blade 12 moves in a pantographic path over a table 18 upon which the workpiece being cut rests. Thus, the blade 12 moves parallel to table 18. Typical of the saws which may be fitted with the acoustical enclosure system of the present invention is an Oliver Model 94 overtable circular saw.

Figure 1:
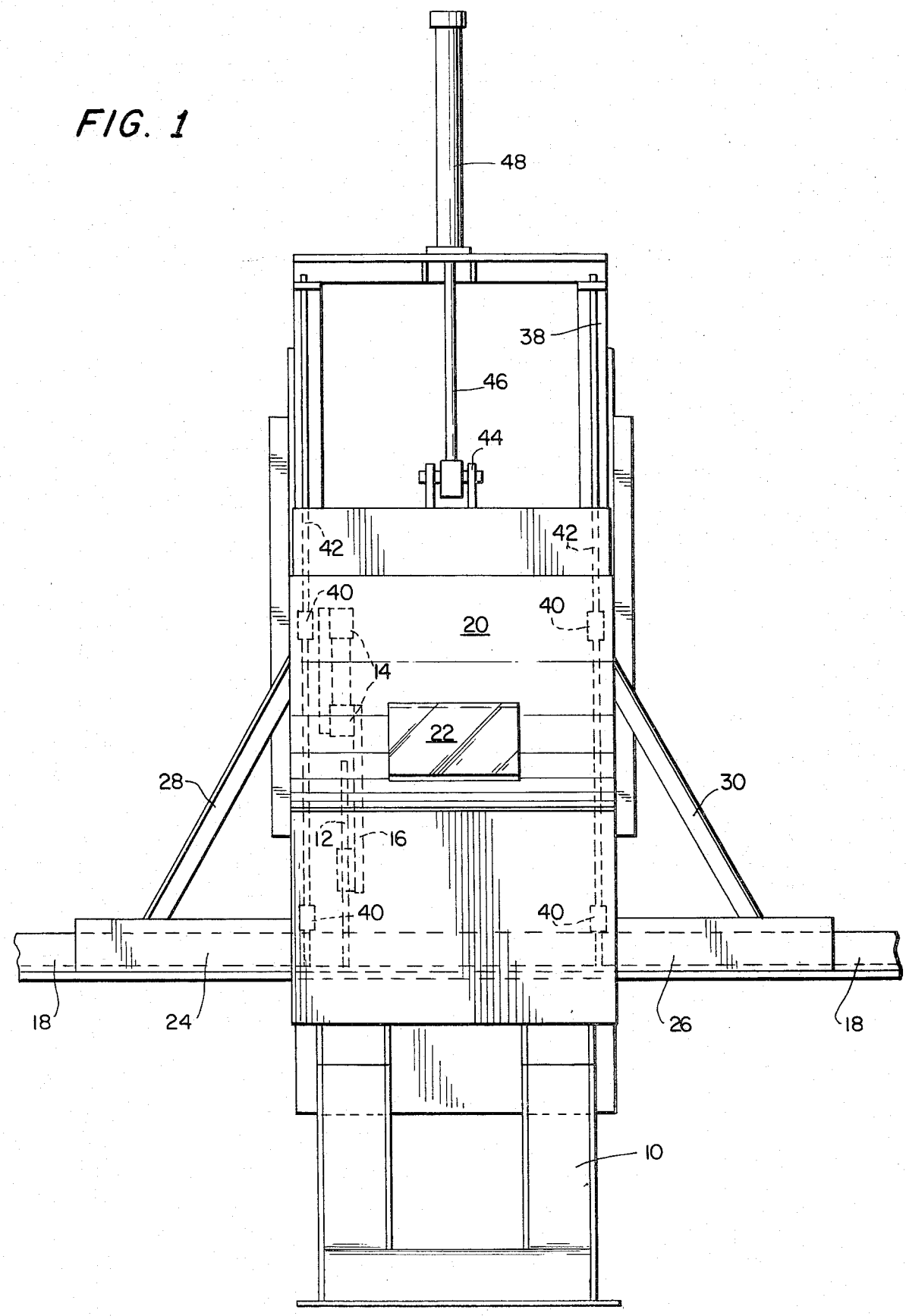
FIG. 1 is a front elevational view of an overtable circular saw system, with the acoustical enclosure of the present invention in place thereover.
Figure 2:
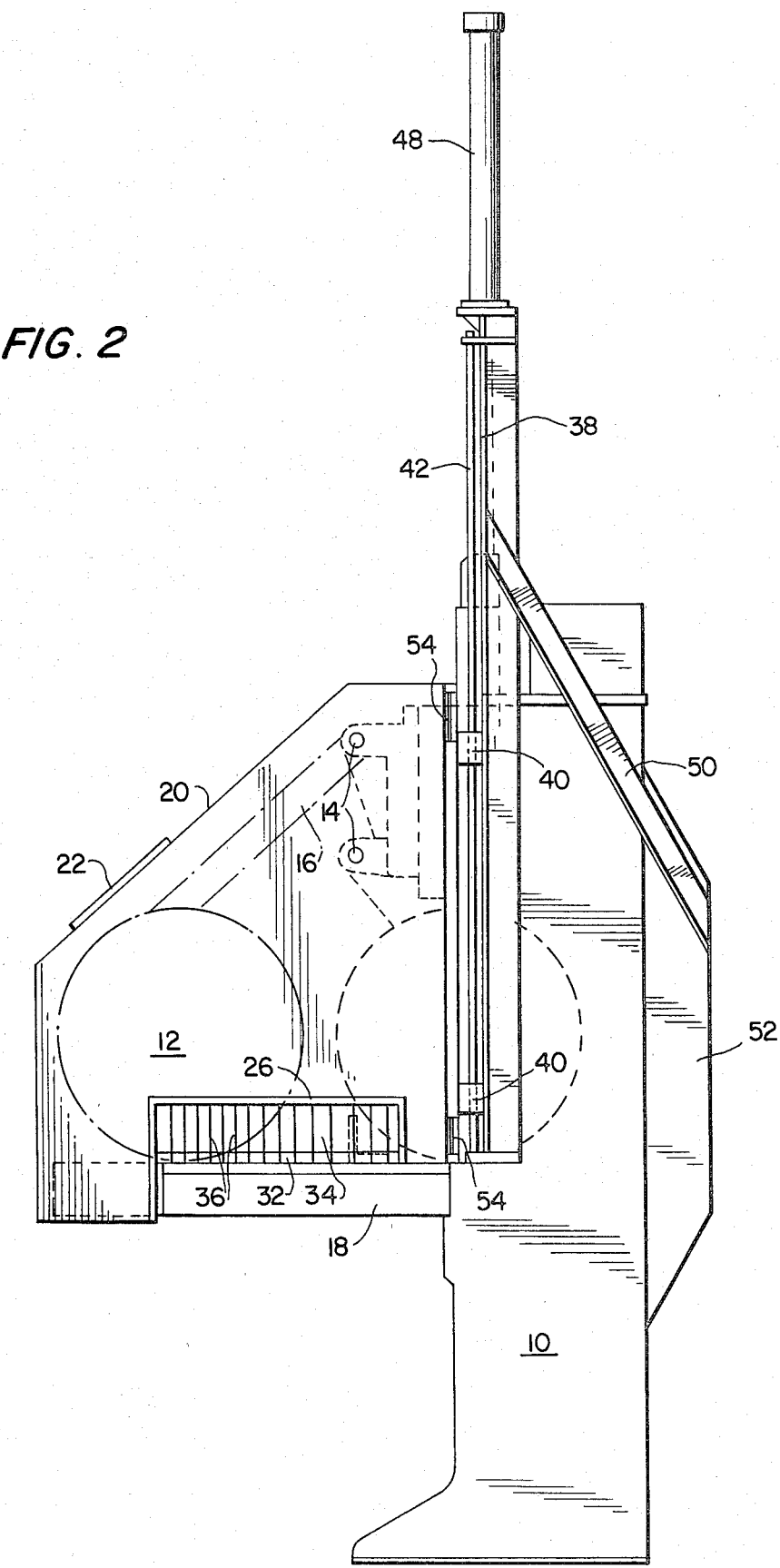
FIG. 2 is a side elevational view of the saw and enclosure.

Fitted to the saw is the acoustical enclosure of the present invention. An acoustical housing 20 is illustrated in FIGS. 1 and 2 positioned over the blade 12 and table 18, in its operative position. Housing 20 is designed to provide acoustical shielding of blade 12. The housing 20 is formed with a solid outer layer or skin, a central layer of acoustical insulation material and an inner layer of perforated skin. Thus, for example, housing 20 may be formed of a sandwich having an outer layer of 0.125 inch (0.318 centimeter) aluminum sheet, a central layer of 2.00 inch (5.08 centimeter) semi-rigid glass fiber insulation within a 0.002 inch (0.0051 centimeter) polyethylene film and an inner layer of 0.028 inch (0.0711 centimeter) perforated aluminum sheet. Of course, the materials of construction may be altered. Thus, for example, the inner and outer skins may be formed of steel, glass fiber reinforced plastic, and the like and the insulation material could be open cell foam, mineral wool and the like.

The housing 20 may also include a window 22 to permit the operator to observe the sawing operation. If such a window 22 is employed, the window 22 is formed of a material which is not readily shattered, so that any fragments of the workpiece being sawed which may contact window 22 will not break it. A suitable material for window 22 is 0.25 inch (0.64 centimeter) Lexan ® plastic, made by General Electric Company.

Extending outwardly on each side of the housing 20 and covering portions of table 18 is a pair of vibration damping arms 24 and 26, which are bolted to housing 20 and stiffening braces 28 and 30 respectively.

As previously mentioned, the major purpose for housing 20 is to provide acoustical enclosure. This housing 20 will contain the noise generated by the saw blade 12 and the portion of the workpiece within the housing 20. When working with materials such as wood, the blade 12 is the major noise source to be controlled. However, when working with metallic materials, such as aluminum extrusions, bars, rods, and the like, vibrations of the material being sawed are also significant noise sources. Thus, the purpose of arms 24 and 26 is to provide vibration damping of the workpiece being sawed, thus furthering the total noise reduction of the system.

Each arm 24 and 26 is construced of a material simular to the outer skin of housing 20 and contains material for clamping the workpiece firmly to the table 18. This material comprises a laminate of a vibration damping material and a spacing material. In contact with the workpiece is a layer 32 of a viscoelastic vibration damping material, such as a 0.500 inch (1.28 centimeter) model 1350 vibration damping material, made by EAR Corporation. This material 32 is attached to arms 24 and 26 by means of a intermediate layer 34 of, for example, 4.00 inch (10.16 centimeter) foam rubber. The foam rubber 34 and vibration damping material 32 are each provided with a plurality of longitudinal slits 36. These slits 36 help the laminate to conform to complex geometric shapes, providing greater surface contact than if left unslit, to thereby reduce vibrations of the workpiece.

The housing 20 and its associated arms 24 and 26 are mounted to a frame 38 by means of slideable guides 40. These guides 40 slide along tracks 42 connected to frame 38 in a manner which will now be explained. Housing 20 is connected by connecting member 44 to the cylinder rod 46 of a reciprocating hydraulic or pneumatic cylinder 48. The operator signals cylinder 48, such as by an electrical connection (not shown), to retract cylinder rod 46, thus raising housing 20. The workpiece to be sawed is positioned on table 18 and the operator gives another signal to piston 48 to extend cylinder rod 46, thus lowering housing 20 and its associated arms 24 and 26 over the workpiece. Cylinder 48 helps assure firm clamping of the workpiece.

Clearly, other means for raising and lowering housing 20 could be employed; for example, pulleys, winches, and the like.

The frame 38 is bolted onto the sides of saw base 10 and to the back of saw base 10 by means of arms 50 and back brace 52 for stability.

Figure 3:
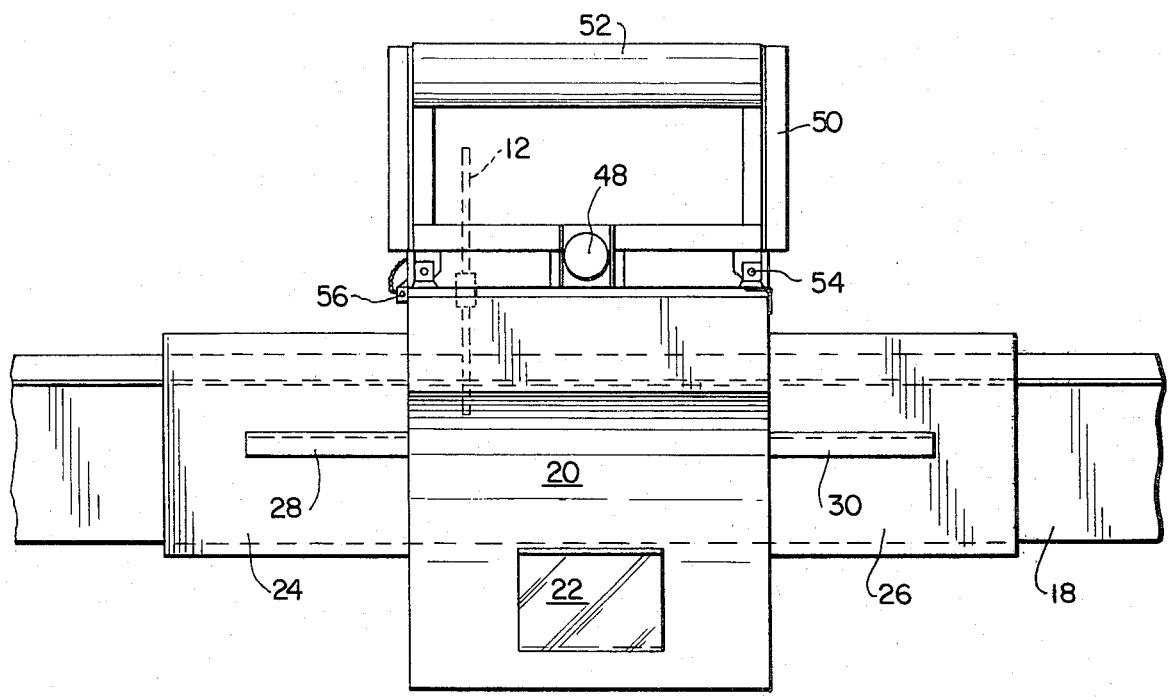
FIG. 3 is a top elevational view of the saw and enclosure in its operational position.
Figure 4:
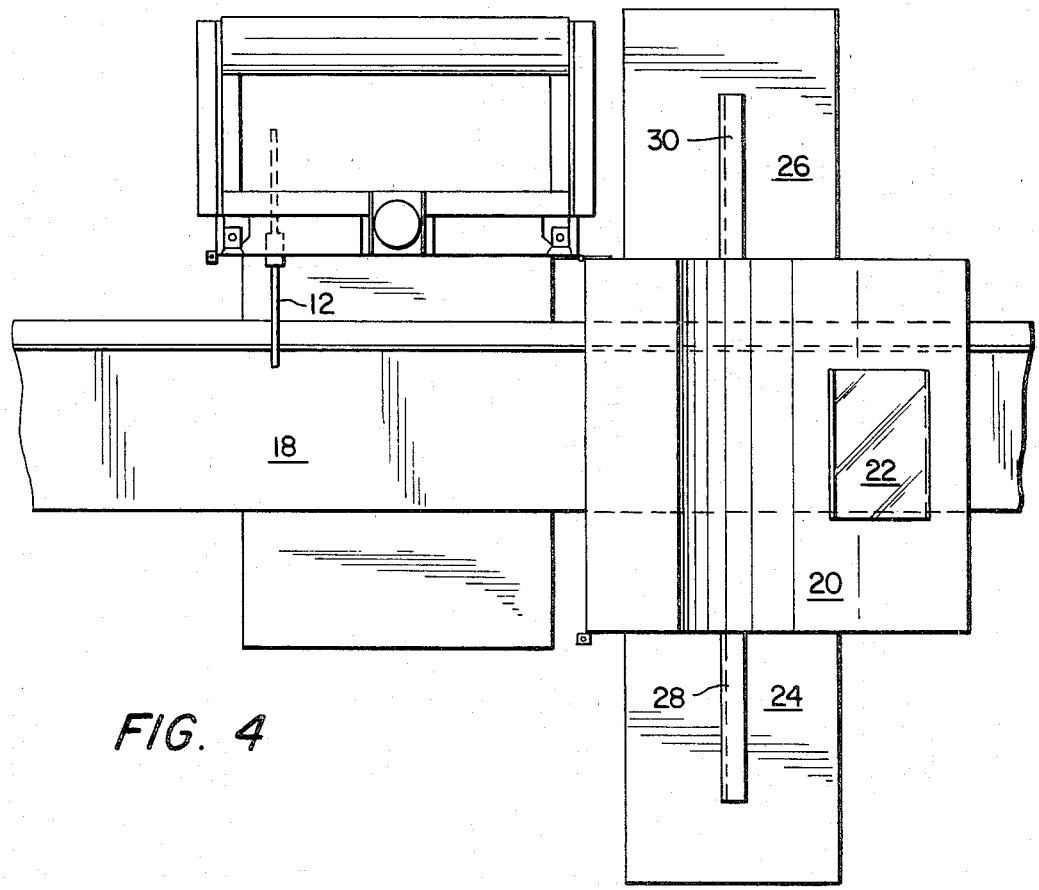
FIG. 4 is a top elevational view of the saw with the enclosure in its open position for access to the saw and enclosure for maintenance purposes.
Figure 5:
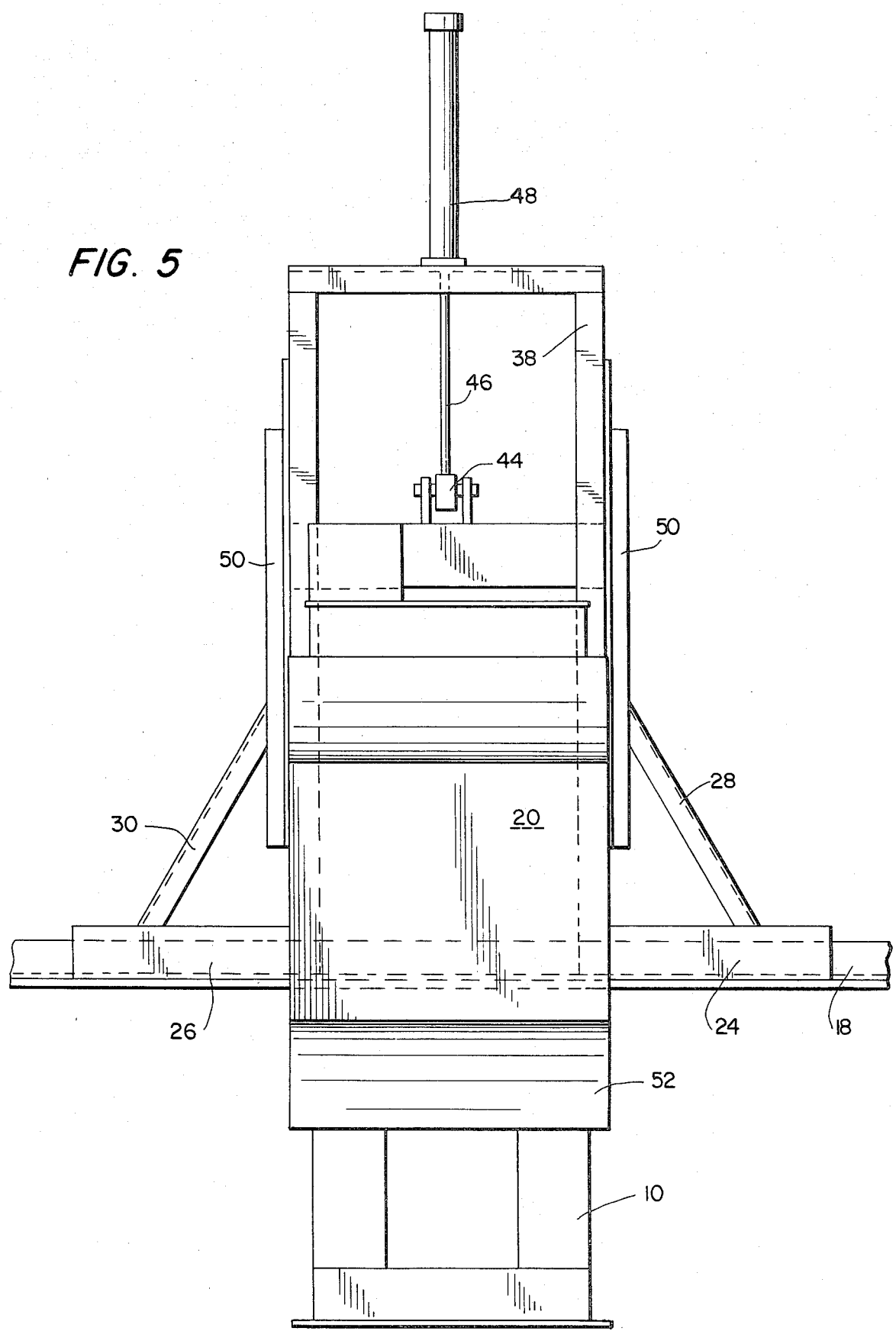
FIG. 5 is a back elevational view of the saw and enclosure system.

FIGS. 3 and 4 illustrate top views of the acoustical enclosure system in its operational and servicing positions. Housing 20 includes a pair of hinges 54 around which housing 20 may swing. Of course, a larger, single hinge could be employed. In its operational position, pin 56 holds housing 20 closed. When pin 56 is removed, housing 20 is free to swing open, such as to permit servicing of the saw 10.

As previously mentioned, when sawing aluminum extrusions sound pressure levels of up to one hundred twenty decibels, A-weighted (reference twenty micropascals), may be reached. With the acoustical enclosure system of the present invention in place, sound pressure levels may be reduced by as much as twelve to fifteen decibels.

While this reduction may seem small, it should be remembered that decibels are a logarithmic measure. Thus, every reduction of three decibels in noise level is, in effect, a halving of sound energy. Thus, a fifteen decibel reduction is approximately a 97% reduction of accoustic energy. Thus, the acoustical system of the present invention produces significant reductions in sound levels and thus greatly benefits operator health and safety.

From the foregoing, it is clear that the present invention provides significant acoustical energy reduction for saws while providing ease of accessibility and operation.

While the acoustical system of the present invention has been described with reference to certain specific embodiments thereof, it is not intended to be so limited thereby, except as set forth in the accompanying claims.

I claim:

1. An acoustical enclosure for an overtable circular saw comprising a housing surrounding the blade of said saw, said housing providing acoustical enclosure for said saw and comprising a solid outer layer, a central layer of acoustical insulation material and a perforated inner layer, a pair of arms extending longitudinally from said housing, said arms providing vibration damping for workpieces while said workpieces are cut by said saw and comprising a solid outer layer, an intermediate layer and an inner vibration damping layer, and means for selectively positioning said enclosure over said saw.

2. The acoustical enclosure of claim 1 wherein said outer layer and said inner of said housing and said outer layer of said arms of each formed from a material selected from the group consisting of aluminum, steel and glass fiber reinforced plastic.

3. The acoustical enclosure of claim 1 wherein said central layer of said housing is formed from a material selected from the group consisting of semi-rigid glass fiber insulation, open cell foam and mineral wool.

4. The acoustical enclosure of claim 1 wherein said intermediate layer of said arms is formed from foam rubber.

5. The acoustical enclosure of claim 1 wherein said inner layer of said arms is formed from a viscoelastic vibration damping material.

6. The accoustical enclosure of claim 1 wherein said intermediate layer and said inner layer of said arms are longitudinally slit.

7. The acoustical enclosure of claim 1 wherein said means for selectively positioning comprises slideable guides mounted on said housing, tracks along which said guides travel and a hydraulic or pneumatic cylinder for raising or lowering said housing.

* * * * *